US012679754B2

(12) United States Patent
Jansson

(10) Patent No.: US 12,679,754 B2
(45) Date of Patent: Jul. 14, 2026

(54) METHOD FOR PROCESS WATER TREATMENT

(71) Applicant: Metso Finland Oy, Espoo (FI)

(72) Inventor: Kaj Jansson, Tampere (FI)

(73) Assignee: Metso Finland Oy, Espoo (FI)

( * ) Notice: Subject to any disclaimer, the term of this patent is extended or adjusted under 35 U.S.C. 154(b) by 1029 days.

(21) Appl. No.: 17/771,108

(22) PCT Filed: Oct. 28, 2019

(86) PCT No.: PCT/FI2019/050768
§ 371 (c)(1),
(2) Date: Apr. 22, 2022

(87) PCT Pub. No.: WO2021/084155
PCT Pub. Date: May 6, 2021

(65) Prior Publication Data
US 2022/0380242 A1 Dec. 1, 2022

(51) Int. Cl.
*C02F 9/00* (2023.01)
*B03D 1/08* (2006.01)
(Continued)

(52) U.S. Cl.
CPC .............. *C02F 9/00* (2013.01); *B03D 1/087* (2013.01); *B03D 1/1431* (2013.01);
(Continued)

(58) Field of Classification Search
CPC .... C02F 9/00; C02F 1/004; C02F 1/24; C02F 1/5245; C02F 1/56; C02F 11/121;
(Continued)

(56) References Cited

U.S. PATENT DOCUMENTS

| | | | |
|---|---|---|---|
| 4,283,017 A | 8/1981 | Coale | |
| 4,460,459 A | 7/1984 | Shaw | |

(Continued)

FOREIGN PATENT DOCUMENTS

| | | |
|---|---|---|
| CL | 198800969 | 3/1989 |
| CL | 202001887 | 12/2020 |

(Continued)

OTHER PUBLICATIONS

Extended European Search Report for European Application No. 19950752.6 dated Jun. 5, 2023.
(Continued)

*Primary Examiner* — Bryan D. Ripa
(74) *Attorney, Agent, or Firm* — Andrus Intellectual Property Law, LLP

(57) ABSTRACT

A method for treating process water of a flotation arrangement, the flotation arrangement including a flotation arrangement including a mineral flotation line and a process water treatment arrangement for treating underflow of the of the mineral flotation line. The method includes the steps of a) dewatering underflow from the flotation in a gravitational solid-liquid separator; b) subjecting supernatant from step a) to cleaning flotation for collecting at least fine particles and residual flotation chemicals, for separating at least fine particles and residual flotation chemicals from the supernatant into cleaning flotation overflow, and for forming purified process water as cleaning flotation underflow; c) removing cleaning flotation overflow as tailings, and d) recirculating purified process water into the mineral flotation line.

25 Claims, 4 Drawing Sheets

(51) Int. Cl.

| | |
|---|---|
| *B03D 1/14* | (2006.01) |
| *C02F 1/00* | (2023.01) |
| *C02F 1/24* | (2023.01) |
| *C02F 1/52* | (2023.01) |
| *C02F 1/56* | (2023.01) |
| *C02F 11/121* | (2019.01) |
| *C02F 101/10* | (2006.01) |
| *C02F 101/20* | (2006.01) |
| *C02F 103/10* | (2006.01) |

(52) U.S. Cl.
CPC ........ *B03D 2203/008* (2013.01); *C02F 1/004* (2013.01); *C02F 2001/007* (2013.01); *C02F 1/24* (2013.01); *C02F 1/5245* (2013.01); *C02F 1/56* (2013.01); *C02F 11/121* (2013.01); *C02F 2101/101* (2013.01); *C02F 2101/20* (2013.01); *C02F 2103/10* (2013.01)

(58) Field of Classification Search
CPC .......... C02F 2001/007; C02F 2101/101; C02F 2101/20; C02F 2103/10; C02F 1/66; C02F 1/52; C02F 2301/08; C02F 1/001; C02F 1/5236; C02F 1/5263; B03D 1/087; B03D 1/1431; B03D 2203/008; B03D 1/02; Y02P 10/20
See application file for complete search history.

(56) References Cited

U.S. PATENT DOCUMENTS

| | | | | |
|---|---|---|---|---|
| 6,679,383 | B2 * | 1/2004 | Gathje | ..................... B03D 1/02 209/166 |
| 2003/0146135 | A1 | 8/2003 | Gathje | |
| 2010/0193408 | A1 * | 8/2010 | Jameson | ............... B03D 1/082 209/164 |
| 2021/0316314 | A1 * | 10/2021 | Lumsden | ................. B03D 1/00 |

FOREIGN PATENT DOCUMENTS

| | | | | | |
|---|---|---|---|---|---|
| CL | 202101095 | | 3/2021 | | |
| CN | 104492592 | A | 4/2015 | | |
| CN | 106045107 | A | 10/2016 | | |
| WO | 2018050950 | | 3/2018 | | |
| WO | WO-2018050950 | A1 * | 3/2018 | .............. | C22B 3/20 |
| WO | 2018067657 | A1 | 4/2018 | | |
| WO | 2020089506 | A1 | 5/2020 | | |
| WO | WO-2020212876 | A1 * | 10/2020 | .............. | B03B 9/00 |

OTHER PUBLICATIONS

Azevedo A. et al., "Treatment and water reuse of lead-zinc sulphide ore mill wastewaters by high rate dissolved air flotation". Minerals Engineering, vol. 127, Oct. 2018, pp. 114-121.
Office Action and Search Report for Chilean Patent Application No. 202201052, dated Nov. 2, 2023.
Article 94(3) EPC Communication regarding European Patent Application No. 19950752.6, mailed Apr. 30, 2024.
Canadian Office Action for Canadian Patent Application No. 3,157,827, mailed May 16, 2024.
Office Action for Chinese Patent Application No. 2020111741440, issued Jul. 21, 2023.
Shi, Yu-Chi et al. "Experimental study on treatment and reuse of wastewater from poly-metallic mine in Hunan", China Tungsten, vol. 30, No. 5, pp. 34-38. Oct. 31, 2015.
Rubio, J. et al. "Overview of flotation as a wastewater treatment technique", Foreign Minerals Engineering, pp. 4-13. May 31, 2002.
Resolution of Acceptance to Registration for Chilean Patent Application No. 202201052, mailed May 28, 2025.
Azevedo A. et al. Treatment and water reuse of lead-zinc sulphide ore mill wastewaters by high rate dissolved air flotation. Minerals Engineering. Aug. 4, 2018, vol. 127, pp. 114-121. Oxford, GB: Pergamon Press.
International Search Report and Written Opinion for International Application No. PCT/FI2019/050768 mailed Feb. 25, 2020.
Office Action for Peruvian Patent Application No. 000681-2022/DIN, dated Apr. 24, 2026.

* cited by examiner

METHOD FOR PROCESS WATER TREATMENT

CROSS-REFERENCE TO RELATED APPLICATIONS

This application is the U.S. national stage application of International Application PCT/FI2019/050768, filed Oct. 28, 2019, which international application was published on May 6, 2021, as International Publication WO 2021/084155 A1 in the English language.

TECHNICAL FIELD

The current disclosure relates to a method for treating process water of a flotation arrangement. In particular, the invention is intended for treating process waters of a flotation arrangement comprising a number of mineral flotation circuits, each mineral flotation circuit arranged to recover a specific valuable metal or mineral.

BACKGROUND

The quality of mineral ores is decreasing as best deposits are increasingly already in use or have been used. Therefore the mined ores may contain significantly less valuable material. In order to run profitable operations, it is necessary to liberate all valuable metals or other valuable materials from the deposits, i.e. utilise polymetallic processes to obtain several different metals from single ore source to keep the operations economically sound.

In flotation processes, different metals and/or minerals require specific flotation chemicals and process conditions to allow recovery of the desired valuable material. This is not a problem if open water circuits are possible to be used. In that case, fresh water may be added into the processes whenever needed, and used process water contaminated by flotation chemicals intended for a specific metal or mineral may be freely discarded. Residual flotation chemicals and build-up of harmful components in the process waters is not an issue.

Typically, the gangue froth removed in the reverse flotation is sent to a tailings dam where the long resident time, typically 20-40 days, is expected to sediment and separate the solids, as well as decompose residual flotation chemicals from the collected and reusable process water. The collected process water is then recirculated back into the beneficiation process. The quality of the recirculated process water plays a significant role in obtaining target recoveries and qualities of the final product.

Today, water shortage, ecological demands placed by legislation and public pressure, costs and extensive space requirements of the aforementioned conventional tailings methods for process water treatment increasingly put pressure to recirculate process waters as main processes in flotation become at least partially closed-loop systems in terms of water usage. Alternative methods for treatment of tailings flows that enables least partially closed-loop water systems may be needed.

A conventional process water or tailings treatment method with typical resident time of 20-40 days may result in acceptable water quality, allowing the treated process water to be reused in the main flotation process, and in other process steps. Apart from being time-consuming, and the conventional treatment method has significant space requirements and is also subject to problems for example due to rain, breakage, and maintenance. Even though residual chemicals become decomposed in the tailings dam due to the long retention time and exposure to UV irradiation, the separated water still may still contain undesired material at least in soluble form. Fines do not have enough time to settle into the sediment. Therefore the water may still be contaminated in view of utilisation in flotation circuits intended for recovery of specific metals/minerals.

When process water treated in a conventional manner is recirculated back into the main flotation processes of a polymetallic operation, it may contain flotation chemicals that are not meant for the specific flotation process or floating of a specific metal or other valuable material. Undesired valuable material may end up floated and recovered during the flotation process of another metal, or bulk flotation takes place. Other negative effects of the above are floating drafts, changes in viscosity of the slurry/pulp, and changes in hydrophobicity which disrupts the working of gravity separators and leads to loss of recovery. Overall, closed water systems result to problems in flotation process runnability and increases disturbances, which makes controlling the flotation process more challenging.

Increase of fine material in thickener overflow may increase the flotation chemical dosage or decrease recovery and quality of desired valuable material. Fines load may also be increased by the need to further comminute low quality ore material by grinding to a smaller particle size, in order for the ore to be in a form that allows recovery of valuable material. Build-up of fines, as well as impurities such as microbes and organic material affects subsequent dewatering negatively.

Fine material, especially of silicate origin, disturb the ability of collector chemicals to function as intended because the silica-containing fines may have opposite surface potentials and may thus attach to mineral surfaces and cause steric effect that prevents collectors from attaching onto the particles, or a steric layer so thick that the collector molecule length is not sufficient to make the ore particles hydrophobic—apparent surface energy remains unmodified and attachment to flotation gas bubbles cannot happen.

Further, fines comprising only undesired material are more difficult depress into underflow/tailings. Selectivity of reagents decreases with increasing fines amount. Fines in the form of compounds such as colloidal hydroxides and carbonates present in the flotation circuit may become combined and cause large surface areas that react with flotation chemicals and use them up.

Changing over to other tailings methods such as thickened tailings, paste, dry stacking or hybrids of these, will result in much shorter sedimentation time due to the new thickeners needed in these process steps. This leads to much shorter sedimentation time, 3-8 h, that result in more fines, residual chemicals and other harmful or detrimental substances ending up in the thickener overflow, and later in recycled process water.

Chemicals and other compounds build up in a closed water loop, as these substances cannot be efficiently removed by standard dewatering operations. Thus, for example, a thickener overflow will comprise material that is difficult to settle, and residual chemicals that will negatively affect the main flotation process. These need to be removed from the overflow if process water is to be recirculated without causing problems in the main processes due to residual flotation chemicals etc. carried over from the dewatering.

Reverse osmosis with semipermeable membranes, nanofiltration, and the like water cleaning methods are very energy-intensive, and in a sense produce "too clean" water.

For example, hardness of water is affected as compounds such as K, Ca, Mn, Mg become removed as well. This may not be beneficial in regard to flotation process efficiency when the cleaned water is recirculated back into flotation processes. Further, these methods require bulky technical solutions such as pre-evaporation and different membranes that are sensitive and expensive.

It is also possible to employ a thickener or a dewatering press after each flotation circuit of a flotation arrangement, and to recirculate the thus separated process water back into each respective flotation circuit so that the flotation chemistries are not mixed, and any residual chemicals are appropriate for each flotation process within a flotation circuit. Fines may still pose a problem as this kind of system does not depress fines efficiently due to the relatively short residence time. Also microbiological contaminants may cause problems.

Conventional solution to control the accumulation of collector chemicals and suppress microbiological growth is to send the flotation froth to the tailings dam with a long retention time. Another method is to use a chemical oxidant, e.g. NaOCl, which can be added before a thickener to decompose collector chemicals and improve sedimentation of very fine material. However, a drawback of using such chemicals are higher Cl levels than can lead to equipment corrosion and failure. They are also hazardous to environment and personnel due to formation of Cl2, if used in acidic conditions. It will also affect the entire flotation operation, making chemical dosage and process control more difficult.

SUMMARY OF THE INVENTION

The method according to the current disclosure is characterized by what is presented in claim 1.

A method for treating process water of a flotation arrangement is disclosed. The flotation arrangement comprises a mineral flotation line comprising a first mineral flotation circuit for treating ore particles comprising valuable materials, the ore particles suspended in slurry, for the separation of slurry into underflow and overflow comprising recovered first valuable material, and a second mineral flotation circuit arranged to receive underflow of the first flotation circuit as slurry infeed, for the separation of slurry into underflow and overflow comprising recovered second valuable material; and a process water treatment arrangement for treating underflow of the of the mineral flotation line. The method comprises the steps of a) dewatering underflow in a gravitational solid-liquid separator to separate a sediment from a supernatant comprising water, residual flotation chemicals in colloidal and soluble compounds, fine particles, and microbes; b) subjecting the supernatant to cleaning flotation, in which at least 90% of the flotation gas bubbles have a size from 0.2 to 250 μm, in a cleaning flotation unit for collecting at least fine particles and residual flotation chemicals, for separating at least fine particles and residual flotation chemicals from the supernatant into cleaning flotation overflow, and for forming purified process water as cleaning flotation underflow, c) removing cleaning flotation overflow as tailings, and d) recirculating purified process water into the mineral flotation line.

With the invention the aforementioned problems in water recirculation and downsides associated with conventional solutions may be alleviated. Overflow or supernatant from the gravitational solid-liquid separator is subjected to cleaning flotation in a cleaning flotation unit so that fine particles, i.e. particles with particle size below 20 μm together with residual flotation chemicals (especially collector chemicals)

may be 1) floated and collected into overflow of the cleaning flotation—the collector chemicals carried over from the main flotation processes act as collectors to the fine particles, 2) separated from the thus purified process water by the cleaning flotation step, and 3) collected away as tailings to be further treated. The resulting purified process water can then be recirculated back into the main flotation process.

As the purified process water comprises significantly less residual flotation chemicals and fine particles, it will not affect the main flotation process detrimentally.

As the overflow from the mineral or main flotation process resides relatively short time in the gravitational solid-liquid separator, the flotation chemicals, collectors carried over in overflow from the main flotation process, do not decompose, as would happen in a conventional tailings dam over time. These collector chemicals may then be utilised in the cleaning flotation step as collectors, thereby making the floating and collection of desired material possible, i.e. collection of fine particles, thus resulting in purified process water.

At the same time, these residual flotation chemicals become used up, and they do not carry over back into the main mineral flotation process when the purified process water is recirculated back. Thus, the main flotation process is unaffected by such undesired flotation chemicals, making the controlling of the mineral flotation process easier.

In the cleaning flotation process, other colloidal material such as C, P, N present in very fine particles may also be removed, as well as any starch-based depressants present in the process water, thereby removing nutrients that would promote microbiological growth in the purified process water. This may improve the result of any subsequent water treatment stages such as filtering. For example, the removal of such material may prevent blocking of filter orifices of ceramic filters.

As the slurry or gravitational solid-liquid separator overflow comprises only fine particles (larger particles end up in sediment), the cleaning flotation may be energy-efficiently utilized at a stage where it is most efficient, i.e. for removing fine particles.

In an embodiment of the method according to the invention, a first process water treatment arrangement is arranged to treat underflow of the second mineral flotation circuit.

In an embodiment, the first mineral flotation circuit is arranged to recover Cu, and the second mineral flotation circuit is arranged to recover Ni.

In an embodiment, the mineral flotation line further comprises a third mineral flotation circuit arranged to receive underflow of the second mineral flotation circuit as slurry infeed, for the separation of slurry into underflow and overflow comprising recovered third valuable material, and that a process water treatment arrangement is arranged to treat underflow of the third mineral flotation circuit.

In a further embodiment, the first mineral flotation circuit is arranged to recover Cu, the second mineral flotation circuit is arranged to recover Ni, and third mineral flotation circuit is arranged to recover sulphide.

In an embodiment, the flotation arrangement comprises a first process water cleaning arrangement for treating underflow of the second mineral flotation circuit and a second process water cleaning arrangement for treating underflow of the third mineral flotation circuit.

In a further embodiment, cleaning flotation overflow of the first process water cleaning arrangement is directed to the third mineral flotation circuit as slurry infeed.

Typical polymetallic flotation operation concerns the recovery of Cu, Ni, and sulphides. The flotation chemicals (collectors) employed in floating and recovery of copper naturally work only on ore particles comprising Cu. Copper is typically very easily floated material, and therefore it is recovered in a first flotation circuit. On the other hand, in a subsequent nickel flotation process, the recovery of ore particles comprising Ni is not detrimentally affected by the Cu specific chemicals, which are carried over into the Ni flotation circuit as underflow of the Cu flotation circuit is led into the subsequent Ni flotation circuit as slurry infeed. Therefore it may not be necessary to clean the process water in between the two first flotation circuits.

However, if the process water from Ni flotation circuit underflow, or final underflow of such a flotation operation, is to be recirculated back into the front end (Cu flotation circuit) of the main flotation operation, the Ni specific flotation chemicals in the process water do affect the recovery of Cu detrimentally. The efficiency of Ni recovery depends on the performance and selectivity of Cu circuit, and problems in the Cu circuit caused by carry-over residual flotation chemicals or fine particles in the recirculated process water may thus also affect the operational performance of the subsequent Ni circuit. Therefore it is necessary to treat final underflow of the flotation operation or line before recirculating any process water back into the main flotation process.

Similarly, the sulphide recovery process in the sulphide flotation circuit is not detrimentally affected by the residual Cu and/or Ni residual flotation chemicals, but recirculating process water from the sulphide flotation circuit requires cleaning of the process water from any residual chemicals, as these may affect the operation of the first flotation circuit.

In each embodiment, the removal of fine particles of various sources from the process water is in any case very beneficial to the main flotation process. It is also foreseeable that underflow from the second flotation circuit (comprising residual flotation chemicals from the Cu and Ni flotation circuits) is cleaned in a first process water cleaning arrangement, from which the purified process water may be recirculated into the main flotation process or flotation line, and overflow of the cleaning flotation directed to the third flotation circuit as slurry infeed to effect the recovery of a third valuable material, i.e. sulphides. The third flotation circuit may then be followed by a second process water cleaning arrangement for removing residual sulphide flotation chemicals prior to recirculating a purified process water back into the main flotation process or line.

In an embodiment, the cleaning flotation unit is a dissolved gas (DAF) flotation unit.

DAF is a microflotation process which is used in various applications in water or effluent clarification. Solid particles are separated from liquid by using very small flotation gas bubbles, microbubbles. The microbubbles with a size range of 30-100 μm are generated by dissolving air or other flotation gas into the liquid under pressure. The bubbles are formed in a pressure drop when dispersion is released. The particles of solid form attach to the bubbles and rise to the surface. A formed, floating sludge is removed from the liquid surface with sludge rollers as DAF overflow. Chemicals may sometimes be needed to aid flocculation and increase solids removal efficiency. Typically, colloids removal is possible with efficient coagulation.

In an embodiment, prior to step b), the temperature of the supernatant is 2 to 70° C.

In an embodiment, prior to step b) pH of the supernatant is 5 to 14.

The temperature and/or the pH of the supernatant may be inherent, i.e. caused by the preceding process steps or environment, or, when desired, the properties may be adjusted as needed, for example to optimise the cleaning flotation in step b).

In an embodiment, in step a), the residence time of overflow in the gravitational solid-liquid separator in under 10 hours, preferably 2 to 8 hours.

In an embodiment, the solids content of the sediment of the gravitational solid-liquid separator is at least 80 w-%.

A relatively short residence time means that the flotation chemicals, in particular the collector chemicals are not decomposed but are carried over with the supernatant, and they may be utilised in the subsequent cleaning flotation step. By effecting a high enough solids content into the sediment, the amount of solid tailings to be treated may be decreased.

In an embodiment, after step a), the supernatant is led into a separator overflow tank.

A separator overflow tank may be used to control the flow of supernatant into the cleaning flotation unit, or into a mixing unit, if such is used. This may help in stabilizing the overall process water treatment operation, as the flow supernatant into the subsequent operational steps is controlled.

In an embodiment, prior to step b), the supernatant is chemically conditioned by adding a coagulant, and/or a flocculant, and/or an additional flotation chemical.

In a further embodiment, the coagulator is chosen from a group comprising: bentonite, fixatives, aluminium salts, iron salts, polymer coagulants.

In a further embodiment, the coagulant is polyaluminium chloride.

In a further embodiment, PAC is added into the supernatant in an amount of 0 to 500 ppm.

In an embodiment, the supernatant is further conditioned by adding a flocculant.

In a further embodiment, a polymer flocculant is added into the supernatant in an amount of 0 to 50 ppm.

In an embodiment, at least one additional flotation chemical is chosen from a group comprising: collectors, activators, depressants, frothers, modifiers.

While normally there are enough flotation chemicals (such as collector chemicals) present as carry-over from the main flotation process in the supernatant, in some cases, it may be necessary to condition the supernatant before the DAF treatment, to ensure that enough of the carry-over fine particles may be removed by the DAF unit. This may be done in a mixing unit configured to allow addition of different chemicals, such as flocculants and/or coagulants and/or conventional flotation chemicals used as additional flotation chemicals, and treatment of fluid with those chemicals. The amount of coagulant and/or flocculant and/or additional flotation chemical is chosen based on the process, and is highly directed by cost of the chemicals. Organic coagulants are more expensive than inorganic ones. Typically, flocculants are added in amounts under 10 ppm.

In an embodiment, prior to step d), the purified process water is subjected to filtration for removing chemicals promoting microbiological growth.

In a further embodiment, in filtration, a filtering unit comprising a ceramic filter is used.

By filtering the purified process water, other harmful components may be removed, thus promoting to cleanliness of the water to be recirculated back into the main flotation process. For example, sliming of equipment may be decreased.

By using the cleaning flotation unit for treating the supernatant, as well as the fine particles, a major part of the chemical residues in particle form may be removed from the purified process water. This allows the utilisation of ceramic filter plates—in ceramic filter plates, the filter pores may be susceptible to blocking by particles of a certain size range. By removing those particles at least partially, blockages may be avoided, and the operation of the filtering unit improved.

In an embodiment, in step b) at least 20% of the fine particles are removed from underflow of the mineral flotation line.

In an embodiment, in step b) at least 20% of the residual flotation chemicals are removed from underflow of the mineral flotation line.

The aim of the method is to remove as much of the fine particles and residual flotation chemicals from the mineral flotation line underflow as possible. Fine particles and residual chemicals remaining in the purified process water are detrimental to the main flotation process, and may decrease the quality and value of the end product (valuable metals/minerals). Both instances also decrease efficiency of the mineral flotation processes. Removal of excess fine particles and residual flotation chemicals may decrease the consumption of fresh flotation chemicals, and fresh water.

In an embodiment, hardness of the purified process water is unaffected by the process water treatment arrangement.

Maintaining water hardness at a goal level allows the controlling of the main flotation process as desired. Flotation chemical addition can be kept at a constant level as water hardness is constant, and hydrophobic particles improves the mineral flotation when hardness is at a certain level. Conventional water treatment methods, such as nanofiltration membranes or reverse osmosis membranes may effect water hardness as compounds (Ca, K, Mn, Mg) become removed together with the detrimental substances. A cleaning flotation unit allows these compounds remain in water, as they are not collected into the cleaning flotation overflow and removed into tailings.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings.

DETAILED DESCRIPTION

Figure 1:
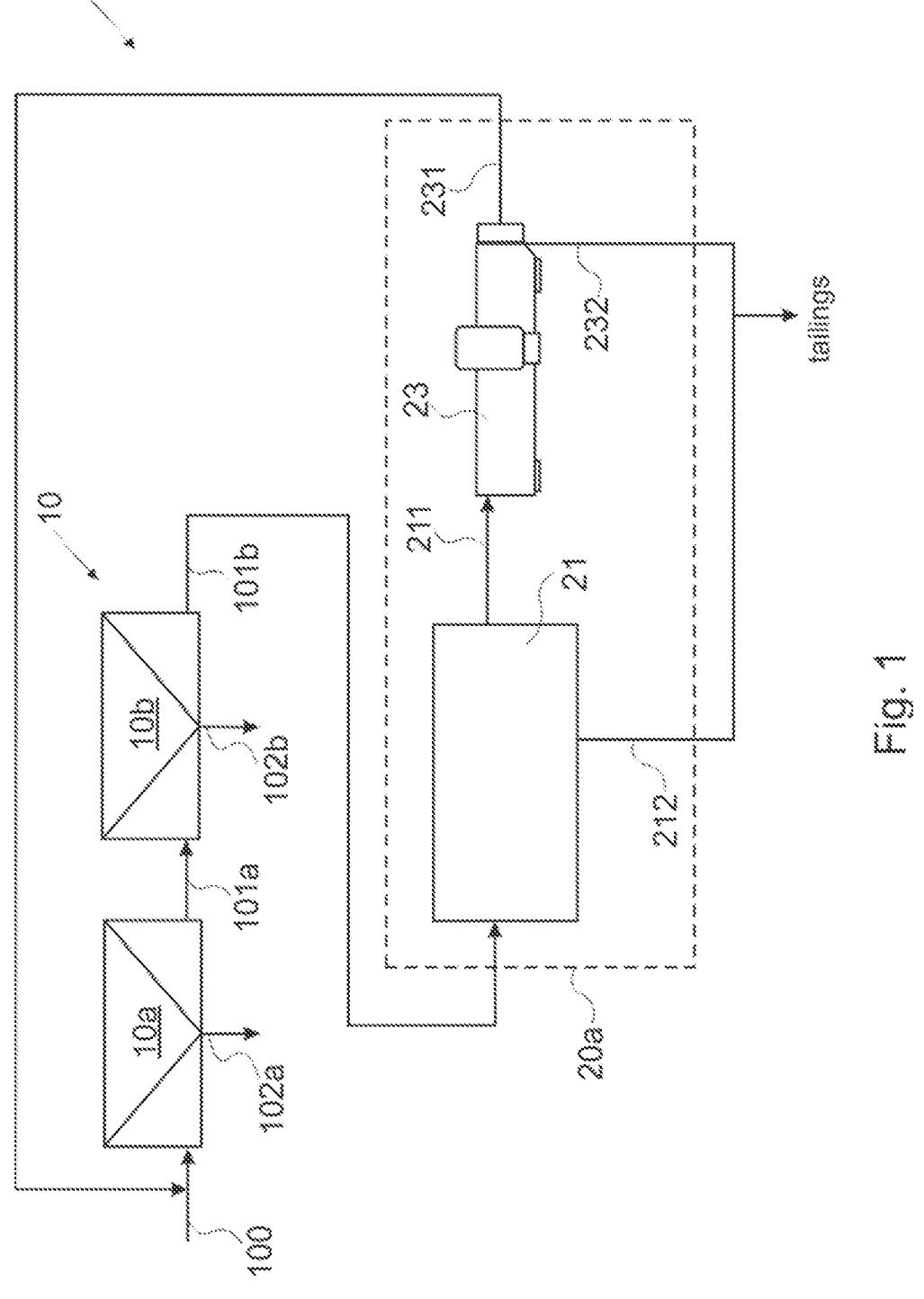
FIGS. 1-4 are a simplified presentations of flotation arrangements in which embodiments of the method according to the invention may be used.

Reference will now be made in detail to the embodiments of the present disclosure, an example of which is illustrated in the accompanying drawings.

The description below discloses some embodiments in such a detail that a person skilled in the art is able to utilize the flotation method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

The enclosed FIGS. 1-4 illustrate a flotation arrangement 1 in a schematic manner. The figures are not drawn to proportion, and many of the components of are omitted for clarity. Some of the components are presented as boxes representing an entire process or arrangement.

The flotation arrangement 1 comprises a mineral flotation line 10. The mineral flotation line 10 in turn comprises a first mineral flotation circuit 10a arranged to treat ore particles comprising valuable materials, suspended in slurry 100, so that the slurry is separated into underflow 101a and overflow 102a. Overflow 102a comprises a recovered first valuable material. In an embodiment, the first valuable material comprises Cu. I.e. the first mineral flotation circuit 10a may be arranged to treat mineral ore particles comprising Cu.

The mineral flotation line 10 further comprises a second mineral flotation circuit 10b, which is arranged to receive underflow 101a from the first mineral flotation circuit 10a as slurry infeed. The second mineral flotation circuit 10b is arranged to separate slurry into underflow 101b and overflow 102b comprising a second valuable material. In an embodiment, the second valuable material comprises Ni. I.e. the second mineral flotation circuit 10b may be arranged to treat mineral ore particles comprising Ni.

The mineral flotation line 10 may further comprise a third mineral flotation circuit 10c, which may be arranged to receive underflow 101b from the second mineral flotation circuit 10b as slurry infeed. In an embodiment, the third mineral flotation circuit 10c is arranged to receive cleaning flotation overflow 232a from a process water cleaning arrangement 20a as slurry infeed (see FIG. 4). The third mineral flotation circuit 10c is arranged to separate slurry into underflow 101c and overflow 102c comprising a third valuable material. In an embodiment, the third valuable material comprises sulphides. I.e. the third mineral flotation circuit 10c may be arranged to treat mineral ore particles comprising sulphides.

Underflows 101a, 101b, 101c may comprise unrecovered ore particles with a particle size below 20 µm, i.e. in a size range falling within the "fine particle" size distribution, silicate-containing particles, soluble $SiO_2$ and other undesired, detrimental or unrecovered material or compounds such as fine particles and larger particles comprising C, P, N, Ca, K, Mn, Mg; residual flotation chemicals such as collector chemicals or starch-based depressants, microbes, etc., suspended and/or dissolved in water.

Figure 3:
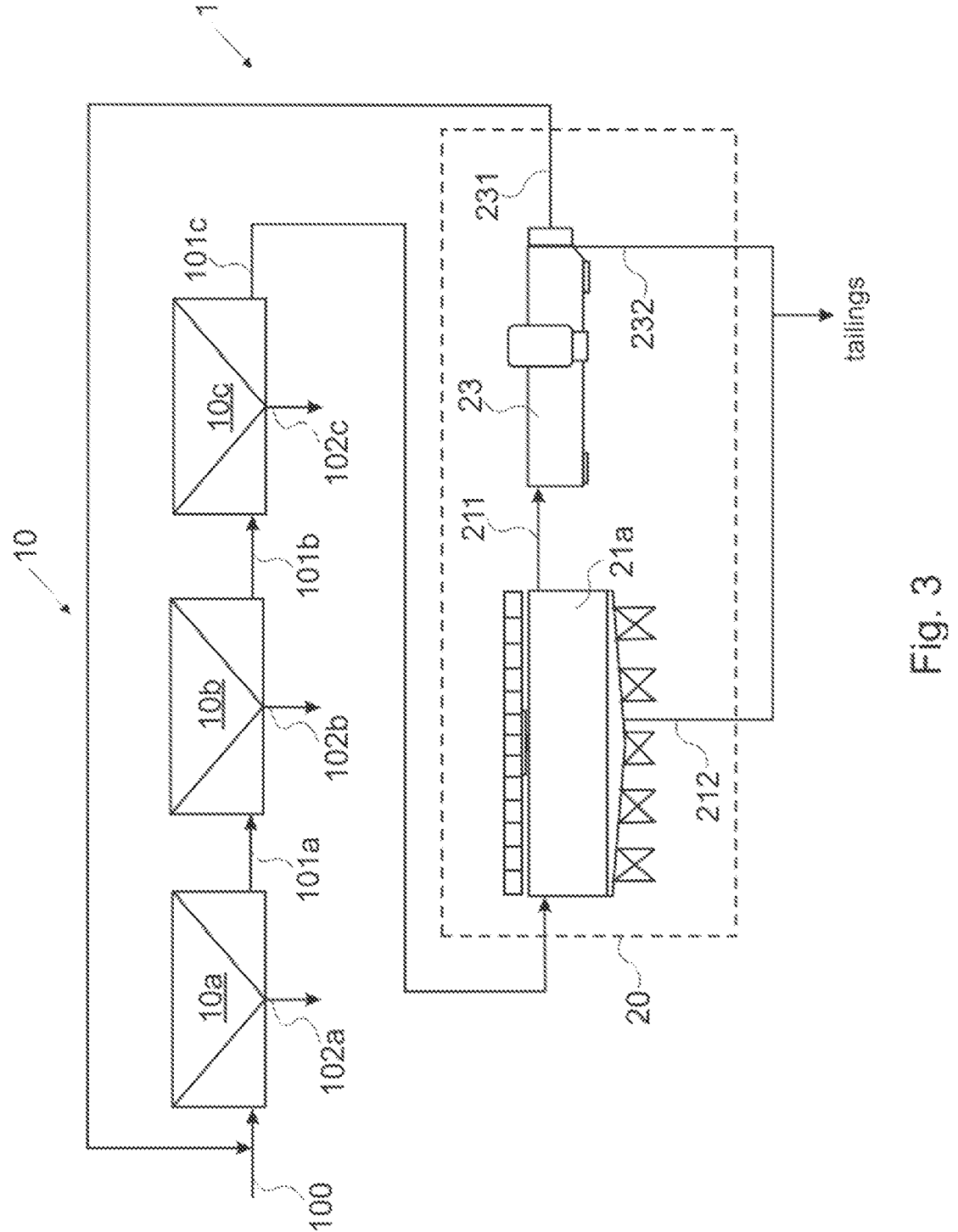
Figure 4:
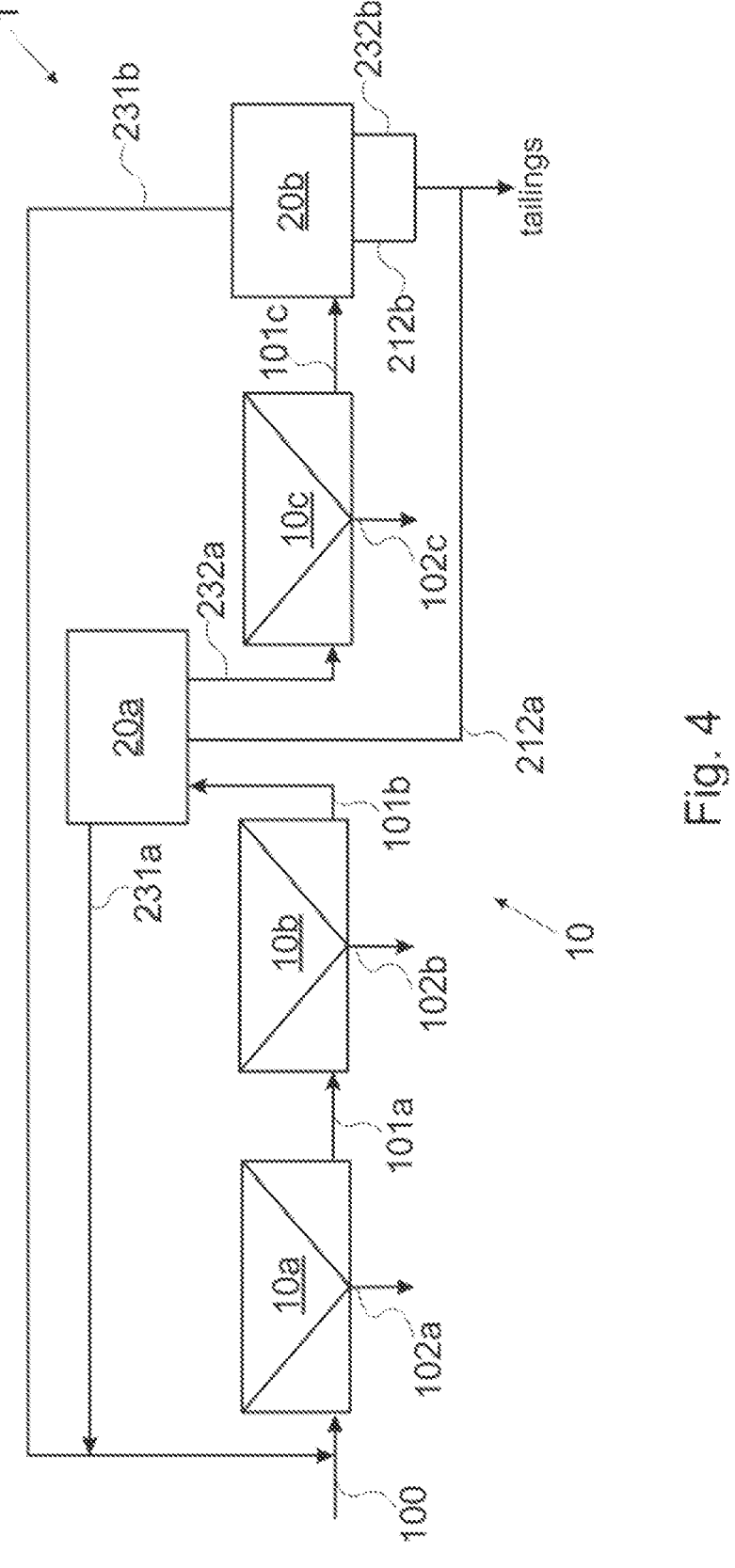

The flotation arrangement 1 further comprises a process water treatment arrangement 20, intended for treating underflow of the mineral flotation line 10, i.e. underflow 101 b, 101 c of a mineral flotation circuit 10 b, 10 c. The process water treatment arrangement 20 comprises a gravitational solid-liquid separator 21 in which underflow from the mineral flotation line 10 is dewatered in a conventional manner, i.e. by separating a sediment 212 comprising larger, heavier particles from a supernatant 211 comprising the aforementioned solid compounds in a fine particle range, as well as any residual flotation chemicals, soluble SiO2, microbes and water. The gravitational solid-liquid separator 21 may, for example, be a thickener 21a (as shown in FIG. 3) or a clarifier.

The process water treatment arrangement 20 further comprises a cleaning flotation unit 23. The cleaning flotation unit employs flotation gas to float particles collected by collector chemicals. In particular, flotation in the cleaning flotation unit 23 is executed by utilising microbubbles, or flotation gas bubbles having a particular size range. In the cleaning flotation and cleaning flotation unit 23 according to the invention, at least 90% of the flotation gas bubbles fall into a size range of 2 to 250 µm. The cleaning flotation may employ dissolved gas flotation (DAF), and the cleaning flotation unit 23 may be a DAF unit. Other methods for effecting flotation with smaller sized flotation gas bubbles may also be employed, such as electrical double layer flotation or membrane flotation.

In the cleaning flotation unit 23, the supernatant 211 is subjected to flotation in order to collect at least fine particles with the help of residual flotation chemicals, i.e. collector chemicals carried over from the mineral flotation circuits 10a, 10b, 10c. Since the flotation chemicals become adsorbed onto the solid fine particles during the cleaning flotation, also these residual flotation chemicals become collected. Additionally also other particles such as particles comprising C, P, N may be collected and removed in the cleaning flotation.

In an embodiment of the invention, the supernatant 211 comprises an amount of residual flotation chemicals (for example Cu, and/or Ni, and/or sulphide specific collectors) as carry-over from the mineral flotation processes in the mineral flotation line 10 sufficient to collect a significant part of the fine particles, as well as to coagulate any soluble detrimental compounds into solid form particles.

Subsequently, at least fine particles are separated from the supernatant into cleaning flotation overflow 232 and removed from the flotation arrangement 1 as tailings. Concurrently, purified process water 231 is formed in the cleaning flotation unit 23 as cleaning flotation underflow. The purified process water 231 may then be recirculated back into the mineral flotation line 10 to be used for example as dilution water for slurry 100 infeed.

Figure 2:
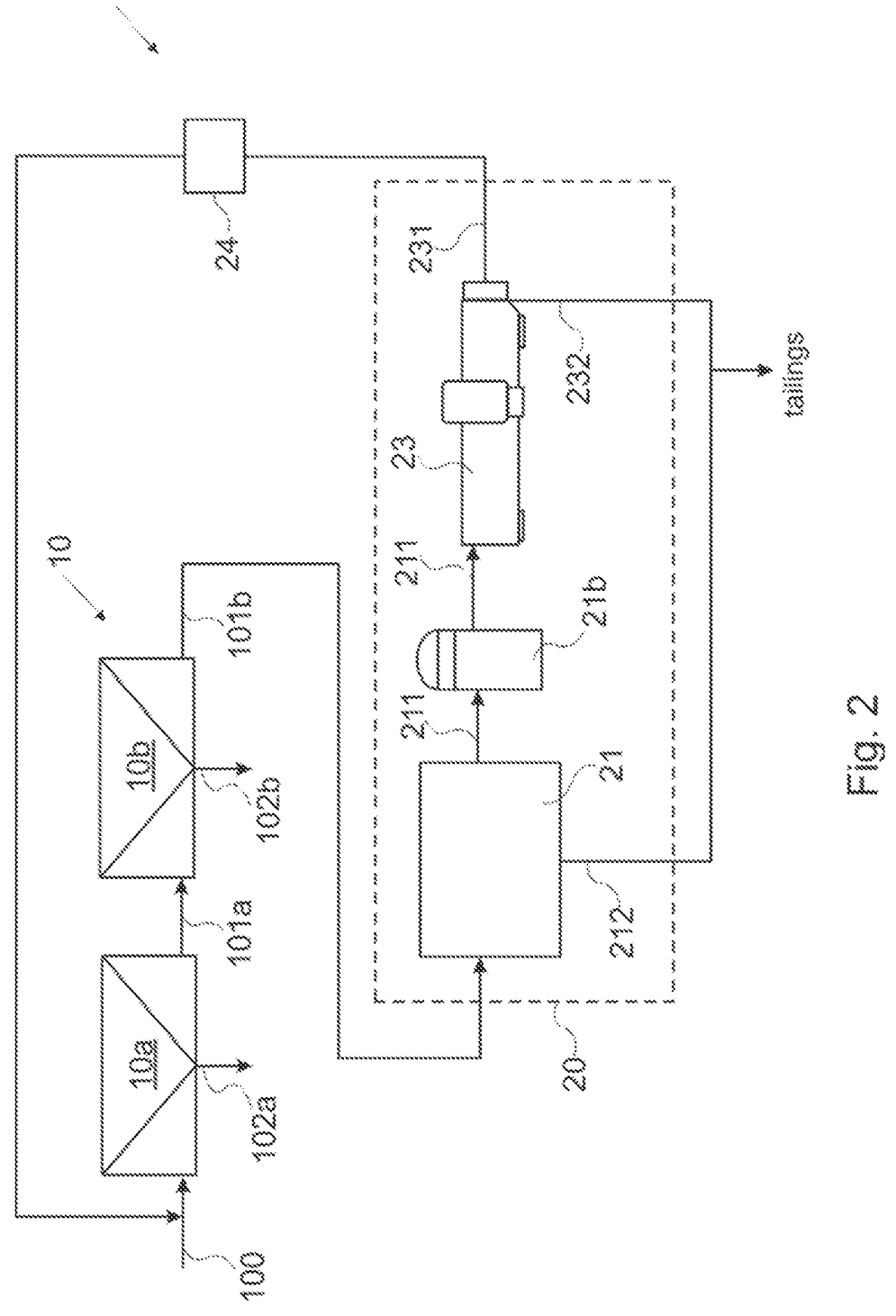

The purified process water 231 may be further treated in a filtering unit 24 to remove microbes and chemicals promoting microbiological growth, or to remove any other undesired chemicals from the purified process water 231 (see FIG. 2). The filtering unit 24 may be of any type known in the field. In an embodiment, the filtering unit 24 comprises a ceramic filter or a number of ceramic filters.

Further, the process water treatment arrangement 20 may comprise a separator overflow tank 21b directly after the gravitational solid-liquid separator 21 (see FIG. 2). The supernatant 211 is led into the separator overflow tank 21b prior to directing it into the cleaning flotation unit 23, for example to control the volumetric flow into the cleaning flotation unit 23.

Further, additionally or alternatively, the process water treatment arrangement 20 may comprise a mixing unit (not shown in the figures) after the gravitational solid-liquid separator, or after the separator overflow tank 21b, if one is employed. The mixing unit may be of any type known in the field, arranged to enable the addition of desired chemicals such as coagulants and/or flocculants and the treatment of the supernatant 211 by chemical conditioning so that at least the silica-containing particles may be flocculated prior to leading the supernatant 211 into the DAF unit 23. Also soluble $SiO_2$ may be thus flocculated into solid form particles and thus subsequently removed from the purified process water.

The addition of coagulant and/or flocculant and/or additional flotation chemical may be required, should the supernatant 211 not comprise a sufficient amount of residual collector chemicals as carry-over from the flotation circuit 10, to ensure sufficient flotation of fine particles, or for example flocculation of silica-containing particles in the cleaning flotation unit 23, or ensure the creation of sufficiently large flocs in the cleaning flotation unit 23.

Both the separator overflow tank 21b and the mixing unit may be further utilised to adjust the temperature and/or pH of the supernatant 211, if desired, to prepare the supernatant for the cleaning flotation.

In an embodiment, the mineral flotation line comprises two mineral flotation circuits 10a, 10b, and the process water treatment arrangement 20 is arranged to treat underflow 101b of the second mineral flotation circuit 10b (see FIGS. 1 and 2). In an embodiment, the mineral flotation line 10 comprises three mineral flotation circuits 10a, 10b, 10c, and the process water treatment arrangement 20 is arranged to treat underflow 101c of the third mineral flotation circuit 10c (see FIG. 3). In an embodiment, the flotation arrangement 1 comprises three mineral flotation circuits 10a, 10b, 10c; as well as a first process water treatment arrangement 20a, arranged to treat underflow 101b of the second mineral flotation circuit 10b, and a second process water treatment arrangement 20b arranged to treat underflow 101c of the third mineral flotation circuit 10c (see FIG. 4). The first process water treatment arrangement 20a and the second process water treatment arrangement 20b have the features as described above in connection with the process water treatment arrangement 20.

In the embodiment, the cleaning flotation overflow 232a from the cleaning flotation unit of the first process water treatment arrangement 20a is directed to the third mineral flotation unit 10c as slurry infeed, to be further treated by mineral flotation to recover a third valuable material from the slurry. The cleaning flotation underflow, comprising purified process water 231a, is recirculated into the mineral flotation line 10, for example to the front end of the first mineral flotation circuit 10a, to be used as dilution water in slurry infeed 100. The cleaning flotation underflow of the second process water treatment arrangement 20b, comprising purified process water 231b, is also recirculated into the mineral flotation line 10. The sediment 212a of the gravitational solid-liquid separator of the first process water treatment arrangement 20a, as well as the sediment 212b, and the cleaning flotation overflow 232b of the second process water cleaning arrangement 20b may be combined and led to tailings treatment.

In the method for treating process water of the flotation arrangement 1, the following steps are effected.

In step a) underflow of the mineral flotation line 10 is dewatered in the gravitational solid-liquid separator 21 to separate the sediment 212 from the supernatant 211 comprising water, silica-containing particle, soluble $SiO_2$, fine particles, microbes and residual flotation chemicals.

The residence time of overflow in the gravitational solid-liquid separator in step a) is under 10 hours. The residence time may be 2 to 8 hours, for example 3.5 hours; 4 hours; 5.75 hours; or 6.5 hours. After step a), the solids content of the sediment 212 of the gravitational solid-liquid separator 21 may be over 80%, by weight.

In step b) the supernatant 211 is subjected to cleaning flotation in the cleaning flotation unit 23 for collecting at least fine particles and residual flotation chemicals, for separating at least fine particles and residual flotation chemicals from the supernatant into cleaning flotation overflow 232, and for forming purified process water 231 as cleaning flotation underflow. In the cleaning flotation, at least 90% of the flotation gas bubbles fall into a size range of 0.2 to 250 μm. The cleaning flotation may be dissolved gas flotation (DAF), i.e. the cleaning flotation unit 23 may be a DAF unit.

Prior to step b), the temperature and the pH of the supernatant 211 may be adjusted to optimize the cleaning flotation in the cleaning flotation unit 23, or the preceding process steps may cause the temperature and/or the pH of the supernatant to display certain values. The temperature of the supernatant 211 may be, or may be adjusted to, 2-70° C. The pH of the supernatant 211 may be, or may be adjusted to, 5-14. In case the aforementioned properties of the supernatant 211 need to be separately adjusted in the separator overflow tank 21b.

In step c) cleaning flotation overflow 232 is removed as tailings, and in step d) purified process water 231 is recirculated into the mineral flotation line 10. Prior to recirculating the purified process water 231 into the mineral flotation line 10, it may be subjected to a filtration step for removing chemicals promoting microbiological growth, or for removing other undesired or detrimental chemical compounds. In the filtration step, a filtering unit 24 comprising a ceramic filter may be used.

In an additional method step, the supernatant 211 may be led into a separator overflow tank 21b after step a). Additionally or alternatively, the supernatant 211 may be chemically conditioned, for example in a mixing unit prior to step b). The supernatant may be led into a mixing unit directly from the gravitational solid-liquid separator 21 or from the separator overflow tank 21b, if such is used.

The supernatant may be chemically conditioned prior to step b), for example in a mixing unit, by adding a coagulant to assist in collecting the $SiO_2$ in the supernatant by coagulating them, present either in the form silica-containing particles or as soluble $SiO_2$. The coagulant may be chosen from a group comprising: inorganic coagulants, aluminium salts, iron salts, organic coagulants.

One possible inorganic coagulant is polyaluminium chloride (PAC). An inorganic coagulant may be added into the supernatant 211 in the mixing unit 22 in an amount of 20 to 2000 ppm, for example in an amount of 50 ppm, 75 ppm, 150 ppm, 225 ppm, 350 ppm, or 400 ppm. In an embodiment, 100 ppm PAC is added. An organic coagulant may be added into the supernatant 211 in an amount of 5 to 200 ppm.

Alternatively or additionally, the supernatant 211 may be conditioned, for example in a mixing unit, by adding a flocculant to further assist in collecting the $SiO_2$ in the supernatant 211 by flocculating them. For example, natural flocculant such as starch or modified starch, or polysaccharides may be used. For example, synthetic flocculants may be used. The synthetic flocculants may display different charges. Examples of synthetic flocculants are: high molecular weight (over 500 000) flocculants such as polyacrylamides (negatively or positively charged, or neutral), or Mannich products (positively charged); and low molecular weight (under 500 000) flocculants such as polyamines (positively charged), polyepiamine (positively charged), polyDADMAC (positively charged), poly(ethylene)imines (positively charged), or polyethylene oxide (neutral).

A flocculant may be added in an amount of 1 to 100 ppm, for example in an amount of 1.25 ppm, 1.75 ppm, 2.25 ppm, 7.5 pp, or 12.25 ppm. In an embodiment, 2 ppm of a flocculant is added.

Alternatively or additionally, in addition to coagulant and/or a flocculant treatment/addition, the supernatant 211 may be conditioned, for example in a mixing unit, by adding one or more conventional flotation chemicals as an additional flotation chemical or as additional flotation chemicals. Such flotation chemicals include 1) collectors, i.e. surface-active organic reagents such as thiol compounds, alkyl carboxylates, alkyl sulfates, alkyl sulfonates, alkyl phosphates, amines, chelating agents, and alkyl phosphonic acids; 2) activators such a s metal hydroxo compounds, or sodium sulfide; 3) depressants such as sodium sulfide or cyanide salts; 4) frothers such as alcohols, polyethers, ethylene oxide, and polyglycol ethers; and 5) modifiers. One or more additional flotation chemicals may be selected from this group to be added into the supernatant 211 prior to step b) to ensure the collection of fine particles, carried over from the main flotation line 10, into the overflow 232 of the cleaning flotation.

By the method according to the invention, at least 20% of the fine particles present in underflow of the mineral flotation line 10, that is, in underflows 101b, 101c of the mineral flotation circuits 10b, 10c may be removed in step b). In some embodiments, 40%, 60% or even 80% of the fine particles may be removed in step b). Further, at least 20% of the residual flotation chemicals present in overflow of the mineral flotation line 10, that is, in underflows 101b, 101c of the mineral flotation circuits 10b, 10c may be removed in step b). In some embodiments, 40%, 60% or even 80% of the residual flotation chemicals may may be removed in step b).

At the same time, hardness of purified process water 231 is unaffected by the process water treatment arrangement 20, 20a, 20b and/or the method for treating process water, i.e. hardness of water of underflow from the mineral flotation line 10 is the substantially the same as hardness of water of the purified process water 231 recirculated into the mineral flotation line 10.

The embodiments described hereinbefore may be used in any combination with each other. Several of the embodiments may be combined together to form a further embodiment. A flotation cell to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for treating process water of a flotation arrangement comprising
   a mineral flotation line comprising a first mineral flotation circuit for treating ore particles comprising valuable materials, the ore particles suspended in a first slurry, for the separation of the first slurry into a first mineral flotation circuit underflow and a first mineral flotation circuit overflow comprising a recovered first valuable material, and a second mineral flotation circuit arranged to receive the first mineral flotation circuit underflow as a second slurry infeed, for the separation of the second slurry infeed into a second mineral flotation circuit underflow and a second mineral flotation circuit overflow comprising a recovered second valuable material, and
   a process water treatment arrangement for treating the second mineral flotation circuit underflow of the mineral flotation line; the method comprising the steps of:
   a) dewatering the second mineral flotation circuit underflow in a gravitational solid-liquid separator to separate a sediment from a supernatant comprising water, residual flotation chemicals, fine particles, and microbes,
   b) subjecting the supernatant to cleaning flotation, in which at least 90% of the flotation gas bubbles have a size from 0.2 to 250 μm, in a cleaning flotation unit for collecting at least fine particles and residual flotation chemicals, for separating at least fine particles and residual flotation chemicals from the supernatant into a cleaning flotation overflow, and for forming purified process water as a cleaning flotation underflow,
   c) removing the cleaning flotation overflow as tailings, and d) recirculating the purified process water into the mineral flotation line.

2. The method according to claim 1, wherein a first process water treatment arrangement is arranged to treat the second mineral flotation circuit underflow of the second mineral flotation circuit.

3. The method according to claim 1, wherein the first mineral flotation circuit is arranged to recover Cu, and the second mineral flotation circuit is arranged to recover Ni.

4. The method according to claim 1, wherein the mineral flotation line further comprises a third mineral flotation circuit arranged to receive the second mineral flotation circuit underflow as a third slurry infeed, for the separation of the third slurry infeed into a third mineral flotation circuit underflow and a third mineral flotation circuit overflow comprising a recovered third valuable material, and that the process water treatment arrangement is arranged to treat the third mineral flotation circuit underflow.

5. The method according to claim 4, wherein the first mineral flotation circuit is arranged to recover Cu, the second mineral flotation circuit is arranged to recover Ni, and the third mineral flotation circuit is arranged to recover sulphide.

6. The method according to claim 4, wherein the flotation arrangement comprises a first process water cleaning arrangement for treating the second mineral flotation circuit underflow of the second mineral flotation circuit and a second process water cleaning arrangement for treating the third mineral flotation circuit underflow of the third mineral flotation circuit.

7. The method according to claim 6, wherein a first cleaning flotation overflow of the first process water cleaning arrangement is directed to the third mineral flotation circuit as the third slurry infeed.

8. The method according to claim 1, wherein the cleaning flotation unit is a dissolved gas flotation (DAF) unit.

9. The method according to claim 1, wherein prior to step b), the temperature of the supernatant is 2 to 70° C.

10. The method according to claim 1, wherein prior to step b), the pH of the supernatant is 5 to 14.

11. The method according to claim 1, wherein in step a), the residence time of overflow in the gravitational solid-liquid separator is under 10 hours.

12. The method according to claim 1, wherein the solids content of the sediment of the gravitational solid-liquid separator is at least 80 w-%.

13. The method according to claim 1, wherein prior to step b), the supernatant is led into a separator overflow tank.

14. The method according to claim 1, wherein prior to step b), the supernatant is chemically conditioned by adding a coagulant and/or a flocculant and/or an additional flotation chemical.

15. The method according to claim 14, wherein the coagulant is chosen from a group comprising: bentonite, fixatives, aluminium salts, iron salts, polymer coagulants.

16. The method according to claim 15, wherein the coagulant is polyaluminium chloride (PAC).

17. The method according to claim 16, wherein the PAC is added into the supernatant in an amount of up to and including 500 ppm.

18. The method according to claim 14, wherein the supernatant is conditioned by adding the flocculant.

19. The method according to claim 18, wherein the flocculant is a polymer flocculant that is added into the supernatant in an amount up to and including 50 ppm.

20. The method according to claim 14, wherein the additional flotation chemical is chosen from a group comprising: collectors, activators, depressants, frothers, modifiers.

21. The method according to claim 1, wherein prior step d), water is subjected to filtration for removing compounds promoting microbiological growth.

22. The method according to claim 21, wherein in the filtration, a filtering unit comprising a ceramic filter is used.

23. The method according to claim 1, wherein at least 20% of the fine particles are removed from the second mineral flotation circuit overflow from the mineral flotation line.

24. The method according to claim 1, wherein at least 20% of the residual flotation chemicals are removed from the second mineral flotation circuit overflow of the mineral flotation line.

25. The method according to claim 1, wherein hardness of the purified process water is unaffected by the process water treatment arrangement.

* * * * *